C. Bruso, Jr,
Pipe Coupling,
Nº 67,161.　　　　　Patented July 30, 1867.
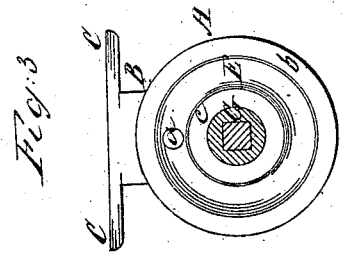
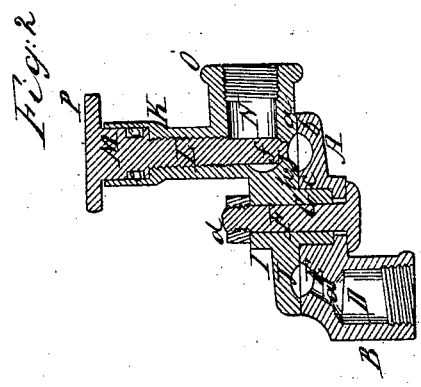
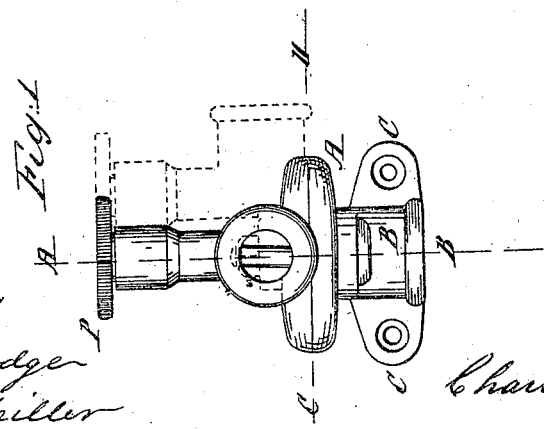
Witnesses
Thos. H. Dodge
Geo. H. Miller
Inventor
Charles Bruso Jr

United States Patent Office

CHARLES BRUSO, JR., OF WORCESTER, MASSACHUSETTS.

Letters Patent No. 67,161, dated July 30, 1867.

IMPROVEMENT IN GAS-PIPE JOINTS.

*The Schedule referred to in these Letters Patent and making part of the same.*

KNOW ALL MEN BY THESE PRESENTS:

That I, CHARLES BRUSO, Jr., of the city and county of Worcester, and Commonwealth of Massachusetts, have invented certain new and useful Improvements in Gas-Pipe Joints; and I do hereby declare that the following is a full, clear, and exact description of the same, reference being had to the accompanying drawings, forming a part of this specification, in which—

Figure 1 represents a front view of my improved gas-pipe joint.

Figure 2 represents a vertical central section on line A B, fig. 1, and

Figure 3 represents a cross-section on line C D, showing the joint.

To enable those skilled in the art to which my invention belongs to make and use the same, I will proceed to describe it more in detail.

In the drawings, the part marked A is the base-piece, the lower part or stem B of which is formed with ears C C through holes, in which are passed screws to fasten the joint in any desired position. There is a hole, D, in the stem B, which narrows somewhat at the point $a$ where it opens into the concave groove E in the top of the base A, the flat surfaces $b$ and $c$ being ground perfectly true and even. There is also a hole through the centre of the base A, through which the holding-bolt F passes, the upper part of the hole being made larger, so as to receive the stem G, which projects from the bottom of the cap-piece I, which has a circular concave groove, J, to match the groove E in the base A. The hole through the stem G and cap I is square, to receive the upper end of bolt F, which is also square. Bolt F passes through both the base A and cap I, where it is held by a nut, $d$, the head of the bolt pressing against the bottom of the base A, as fully shown in the drawings. From the top of the cap I projects the valve-support K, the hole in which is made much larger at the top than at the bottom, as fully shown in the drawings. L is the valve-spindle, the central part of which is provided with a screw-thread, which works in a thread cut in the valve-support K. The upper part M of the valve-spindle is grooved out to receive a fibrous packing, $e$, while the lower end $f$ is turned down to fit into the valve-seat in the cap I to close securely and tight the opening or hole which leads from the concave grooves E and J to the hole N in the stem O.

The operation is as follows: The stem B is screwed upon the end of the pipe, and then screws are passed through ears C C, which fasten the whole device in place. The pipe to which the burner is attached is now screwed into the stem O and the gas turned on to fill the pipe attached to the stem B. When it is desired to light the gas the valve-spindle is turned up by means of the head P, when the gas will pass from stem B through the grooves E and J and stem O to the burner. The cap-piece I can be turned entirely around without danger of the gas leaking, since bolt F turns with the cap I, thereby preventing any strain coming upon nut $d$ which is calculated to unscrew it.

If the surfaces $b\ c$ and $g\ h$ should ever become at all uneven they can be easily ground to a perfect and gas-tight fit. The joint in this respect is far superior to those in common use, which, when they once get out of true, are nearly useless. Then, again, my joint or yielding connection is more substantial, simple, and is composed of a less number of parts than those commonly used.

Having described my improved gas-pipe joint or connection, what I claim, and desire to secure by Letters Patent, is—

1. The combination of the tubular stem B and grooved disk or plate A with the correspondingly grooved cap I and its tubular stem O, under the arrangement and for operation as set forth.

2. The combination with the concentrically grooved plates or disks applied to each other, as described, of the valve and its spindle, mounted and arranged in the joint in the manner herein shown and described.

CHARLES BRUSO, JR.

Witnesses:
THOS. H. DODGE,
GEO. H. MILLER.